US012731978B2

(12) United States Patent
Miyashita

(10) Patent No.: US 12,731,978 B2
(45) Date of Patent: Sep. 8, 2026

(54) SWITCH DEVICE

(71) Applicant: Rohm Co., Ltd., Kyoto (JP)

(72) Inventor: Takashige Miyashita, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 144 days.

(21) Appl. No.: 18/607,205

(22) Filed: Mar. 15, 2024

(65) Prior Publication Data

US 2024/0322553 A1 Sep. 26, 2024

(30) Foreign Application Priority Data

Mar. 20, 2023 (JP) ................................ 2023-043994

(51) Int. Cl.
*H02H 3/08* (2006.01)

(52) U.S. Cl.
CPC .................................... *H02H 3/08* (2013.01)

(58) Field of Classification Search
CPC .......... H02H 3/021; H02H 3/08; H02H 3/087; H03K 17/687
USPC .......................................................... 361/115
See application file for complete search history.

(56) References Cited

U.S. PATENT DOCUMENTS

2005/0116692 A1* 6/2005 Sugiyama ............. H02M 3/156 323/222
2008/0203986 A1* 8/2008 Nakatani ............... H02M 3/156 323/282
2013/0002224 A1* 1/2013 Lin ....................... H02M 3/158 323/285
2014/0118583 A1* 5/2014 Shida ..................... H04N 25/78 348/250
2019/0393697 A1* 12/2019 Jordanger ............ H03K 17/163

FOREIGN PATENT DOCUMENTS

JP 2021-040482 3/2021

* cited by examiner

*Primary Examiner* — Kevin J Comber
(74) *Attorney, Agent, or Firm* — Fish & Richardson P.C.

(57) ABSTRACT

The present disclosure provides a switch device. The switch device includes a switch element, a DA converter and output voltage control unit. The switch element includes: a first end to which an input voltage is applicable; a second end to which an output voltage is applicable; and a control terminal. The output voltage control unit includes the switch element and configured to control the output voltage. The output voltage control unit is configured to generate a control voltage applicable to the control terminal such that the output voltage is gradually increased according to a ramp-like change in an output of the DA converter.

7 Claims, 5 Drawing Sheets

SWITCH DEVICE

TECHNICAL FIELD

The present disclosure relates to a switch device.

BACKGROUND

A conventional switch device using a switch element to implement a fuse function is known (for example, patent document 1). For example, the switch element is turned off upon detecting an overcurrent.

PRIOR ART DOCUMENT

Patent Publication

[Patent document 1] Japan Patent Publication No. 2021-40482

DETAILED DESCRIPTION OF THE EMBODIMENTS

Details of the exemplary embodiments of the present disclosure are described with the accompanying drawings below.

1. Switch Element

Figure 1:
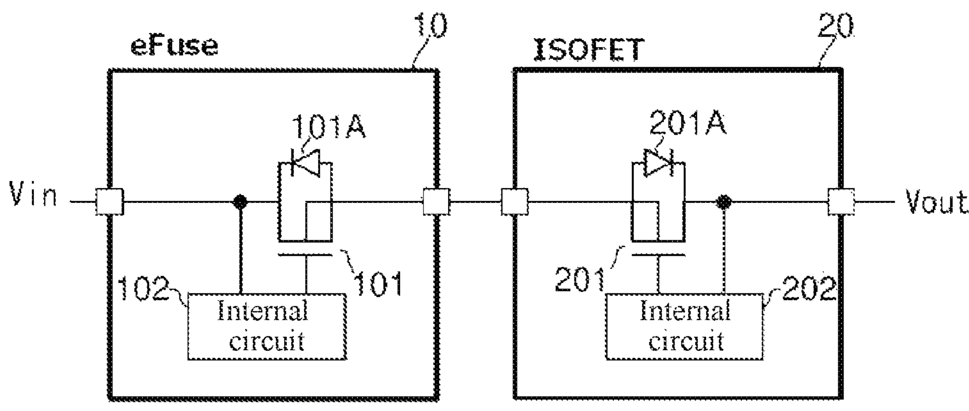
FIG. 1 is a diagram of a configuration of a switch system of a comparison example.

FIG. 1 shows a diagram of a configuration of a switch system of a comparison example. The switch system shown in FIG. 1 includes a switch device 10 in charge of an electronic fuse (eFUSE) function, and a switch device 20 in charge of an anti-backflow function (an ion sensitive organic field effect transistor (IOSFET)).

The switch device 10 includes a switch element 101 and an internal circuit 102 integrated on one chip. The switch element 101 is formed by an N-channel metal-oxide-semiconductor field-effect transistor (NMOSFET). The switch element 101 is built-in with a body diode (a parasitic diode) 101A. A drain of the switch element 101 is connected to an application end of an input voltage Vin. The internal circuit 102 controls on/off of the switch element 101 by controlling a gate of the switch element 101.

The switch device 20 includes a switch element 201 and an internal circuit 202 integrated on one chip. The switch element 201 is formed by an NMOSFET. The switch element 201 is built-in with a body diode 201A. A source of the switch element 201 is connected to a source of the switch element 101. A drain of the switch element 201 is connected to an application end of an output voltage Vout. The internal circuit 202 controls on/off of the switch element 201 by controlling a gate of the switch element 201.

For example, upon detecting an overcurrent flowing through the switch device 10 or 20, the switch element 101 is turned off via the internal circuit 102 to implement the eFUSE function. However, when there is only the switch device 10, even if the switch element 101 is turned off, it remains possible that a current may flow in reverse from the side of the output voltage Vout through the body diode 101A to the side of the input voltage Vin. Thus, the switch device 20 is provided, and the body diode 101A and the body diode 201A are connected in directions opposite to each other, so as to suppress a backflow. Moreover, when the switch element 101 is turned off, the switch element 201 is also controlled to be off via the internal circuit 202.

Figure 2:
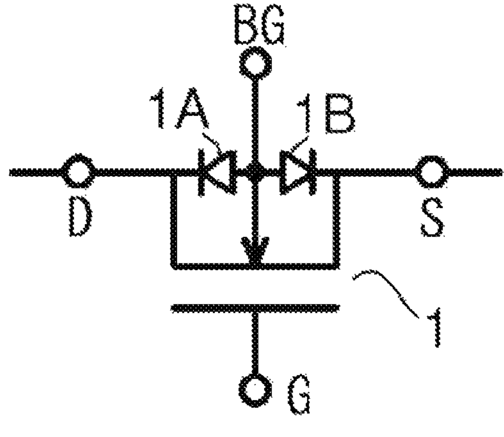
FIG. 2 is a diagram of a configuration of a switch element of the present disclosure.

In contrast, FIG. 2 shows a diagram of a configuration of a switch element 1 of the present disclosure. The switch element 1 is formed by an NMOSFET. According to the switch element 1, an eFUSE function and an anti-backflow function can be implemented via one field effect transistor (FET). The switch element 1 includes a drain D, a source S, a gate G and a back gate BG. In the switch element 1, because the back gate is not shorted with the source or the drain, a body diode 1A connected between the back gate and the drain and a body diode 1B connected between the back gate and the source are valid. The body diode 1A and the body diode 1B are connected in directions opposite to each other.

With such switch element 1, in comparison with the switch system of the comparison example, an area can be reduced if a same on resistance is formed by a same element with a same withstand voltage.

Figure 3:
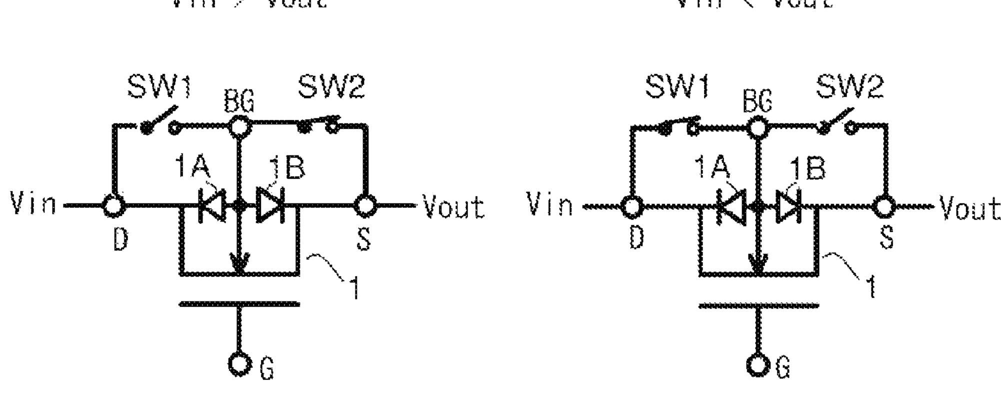
FIG. 3 is a diagram of an operation mode of a switch element.

In case where the switch element 1 is used, an operation mode shown in FIG. 3 is applied. In FIG. 3, a drain of the switch element 1 is connected to an application end of an input voltage Vin, and a source of the switch element 1 is connected to an application end of an output voltage Vout. Moreover, a first switch SW1 is connected between the drain and the back gate of the switch element 1, and a second switch SW2 is connected between the source and the back gate of the switch element 1.

On the left of FIG. 3, states of the switches SW1 and SW2 controlled in a condition where Vin>Vout are shown. More specifically, the switch SW1 is turned off and the switch SW2 is turned on. Accordingly, the body diode 1A is valid and the body diode 1B is invalid. Thus, when Vin>Vout, a current is prevented from flowing from the side of Vin to the side of Vout when the switch element 1 is turned off.

On the other hand, on the right of FIG. 3, states of the switches SW1 and SW2 controlled in a condition where Vin<Vout are shown. More specifically, the switch SW1 is turned on and the switch SW2 is turned off. Accordingly, the body diode 1A is invalid and the body diode 1B is valid. Thus, when Vin<Vout, a current is prevented from flowing from the side of Vout to the side of Vin (achieving the anti-backflow function) when the switch element 1 is turned off.

2. Switch Device

A switch device of the present disclosure using the switch element 1 of the operation mode is described below.

Figure 4:
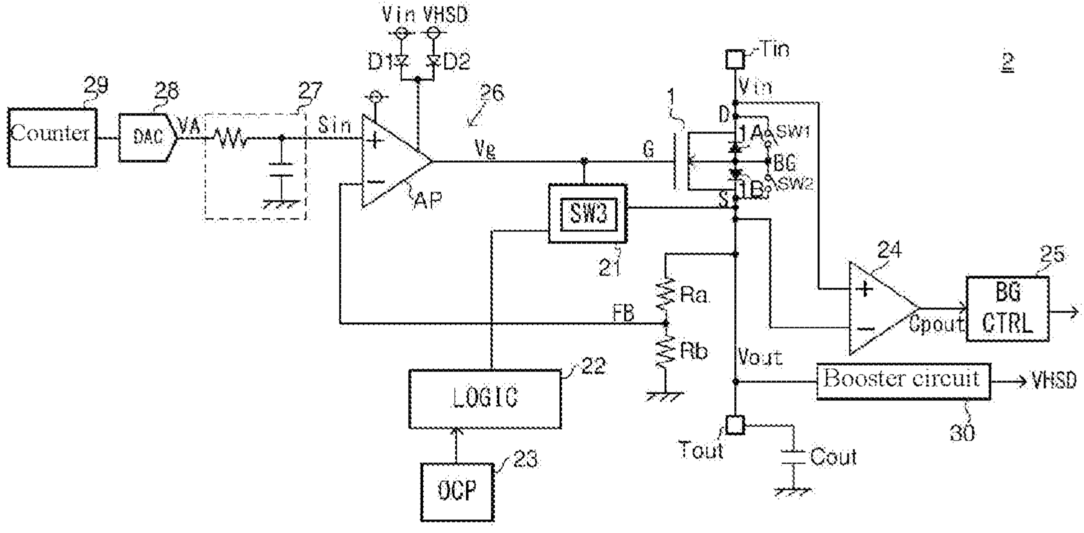
FIG. 4 is a diagram of a configuration of a switch device of the present disclosure.

FIG. 4 shows a diagram of a configuration of a switch device 2 of the present disclosure. The switch device 2 includes the switch element 1, the first switch SW1, the second switch SW2, a switch circuit 21, a logic unit 22, an overcurrent detection unit 23, a comparator 24, a back gate control unit 25, an output voltage control unit 26, a low-pass filter 27, a digital-to-analog converter (DAC) 28 and a counter 29.

As described above, the switch element 1 is built-in with the body diodes 1A and 1B connected in directions opposite to each other. The first switch SW1 is connected between the back gate and the drain, and the second switch SW2 is connected between the back gate and the source. The drain of the switch element 1 is connected to an input terminal Tin. The input voltage Vin is applied to the input terminal Tin. The source of the switch element 1 is connected to an output terminal Tout. The output voltage Vout is output from the output terminal Tout.

The switch circuit 21 includes a third switch SW3 to control a gate/source voltage Vgs of the switch element 1. The third switch SW3 is connected between the gate and the source of the switch element 1. The logic unit 22 controls such as the switch circuit 21. The overcurrent detection unit 23 is a circuit that detects an overcurrent flowing through the switch element 1. Upon detecting an overcurrent by the overcurrent detection unit 23, the logic unit 22 sets the third switch SW3 to be turned on. Accordingly, the gate and the source of the switch element 1 are shorted, and the switch element 1 becomes turned off. As such, protection of the eFUSE function of the switch element 1 is achieved.

A non-inverting input terminal of the comparator 24 is connected to the application end of the input voltage Vin. An inverting input terminal of the comparator 24 is connected to the application end of the output voltage Vout. Accordingly, the comparator 24 compares the input voltage Vin with the output voltage Vout, and outputs a comparison output signal Cpout to the back gate control unit 25. The back gate control unit 25 controls on/off of the first switch SW1 and the second switch SW2 according to a level of the comparison output signal Cpout. That is to say, control is performed as shown in FIG. 3 according to a size relationship between Vin and Vout.

The output voltage control unit 26 is configured to generate a low dropout of the output voltage Vout based on the input voltage Vin, and includes an error amplifier AP, the switch element 1, and voltage divider resistors Ra and Rb. An input signal Sin is input to a non-inverting input terminal of the error amplifier AP. The voltage divider resistors Ra and Rb are connected in series between the source of the switch element 1 and an application end of ground potential. A node connected with the voltage divider resistors Ra and Rb is connected to an inverting input terminal of the error amplifier AP. Accordingly, a feedback voltage FB obtained by dividing the output voltage Vout by the voltage divider resistors Ra and Rb is input to the error amplifier AP. An output terminal of the error amplifier AP is connected to the gate of the switch element 1. The error amplifier AP applies a signal amplifying a difference between the input signal Sin and the feedback signal FB as a control voltage Vg to the gate.

Accordingly, the output voltage Vout is controlled by controlling the feedback voltage FB to be consistent with the input signal Sin. Herein, the input signal Sin is generated by the counter 29, the DAC 28 and the low-pass filter 27.

The counter 29 counts a clock, and outputs a count value to the DAC 28. The DAC 28 performs digital-to-analog conversion on the input count value (in digital data), and outputs an analog voltage VA. The analog voltage VA is smoothed by the low-pass filter 27 into an input signal Sin. As shown in FIG. 4, the low-pass filter 27 is formed by a resistance-capacitance (RC) filter.

As the count value of the counter 29 increases, the analog voltage VA rises and the input signal Sin also rises. The analog voltage VA rises in a stepped manner as time elapses. Accordingly, the input signal Sin changes as a slope as the rise of the voltage value as time elapses, and the output voltage Vout can be soft-started by the operation of the output voltage control unit 26. Thus, by having the switch element 1 to be an on state at startup, an inrush current is suppressed from flowing to a large-capacity output capacitor Cout externally connected to the output terminal Tout.

For example, in the method of generating a signal in a sloped shape by flowing a fixed current through a capacitor, the capacitor needs to be externally connected to a switch device. The reason of the above is that, the fixed current needs to miniaturize when a capacitor is built-in. In contrast, in this embodiment, since the DAC 28 is built-in the switch device 2 and the input signal Sin in a sloped shape is generated, external components can be reduced.

Moreover, a soft-start time (a time for the input signal Sin to rise from 0 V to a maximum voltage) is determined according to a frequency of the clock counted by the counter 29. Thus, because the precision of the soft-start time is determined by the precision of the frequency of the clock, a deviation of the soft-start time can be significantly suppressed. Moreover, the soft-start time can also be set to be variable by setting the frequency of the clock to be variable.

Moreover, since the fluctuation when switching the analog voltage VA output from the DAC 28 (rising in a stepped manner) becomes a ripple in the current flowing to the output capacitor Cout, the low-pass filter 27 is provided on an output side of the DAC 28 to suppress the ripple. In addition, the ripple can also be suppressed by increasing the resolution of the output of the DAC 28.

3. Operation at Startup

Figure 5:
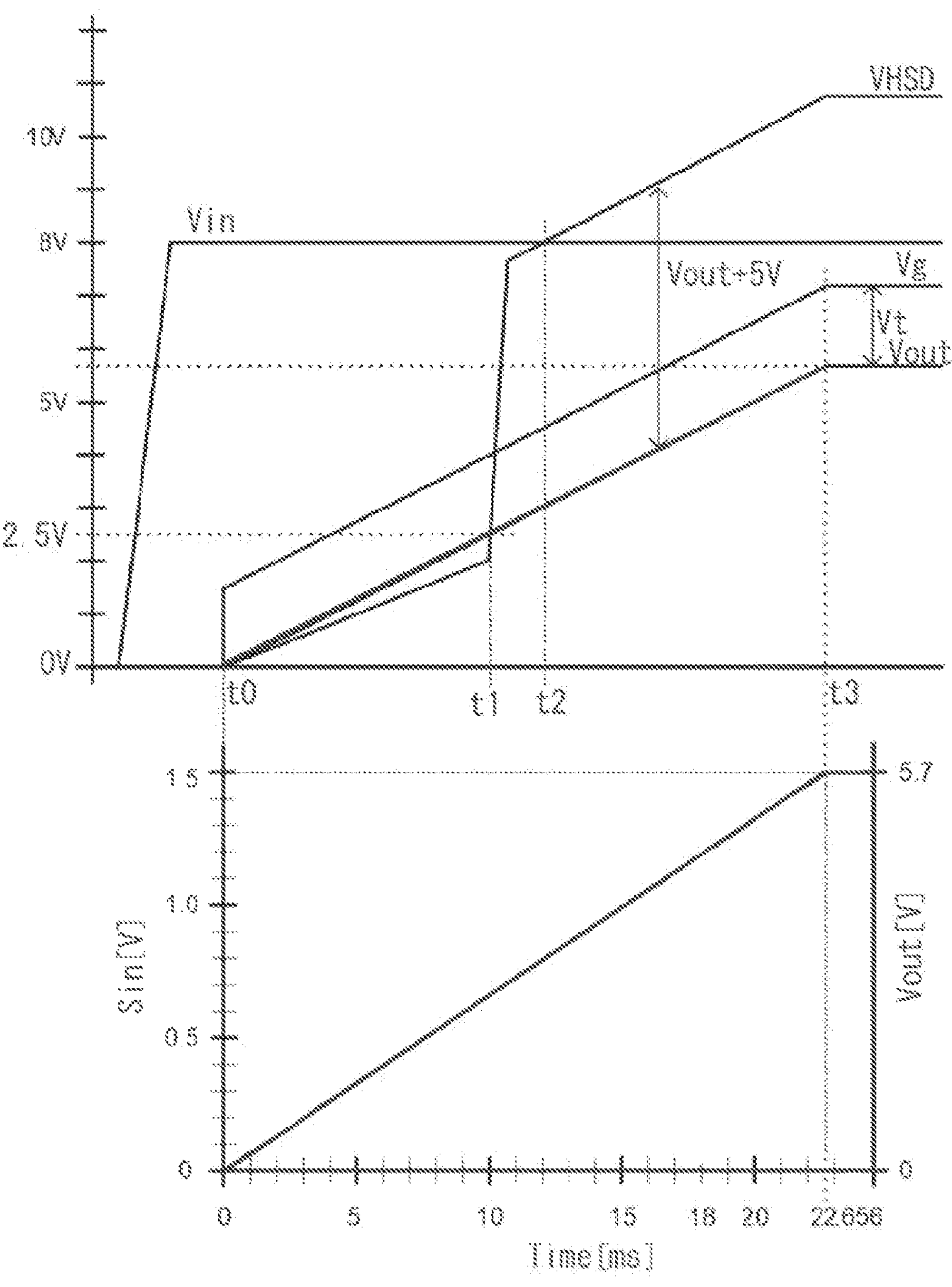
FIG. 5 is a timing diagram of a first operation example of a switch device at startup.
Figure 6:
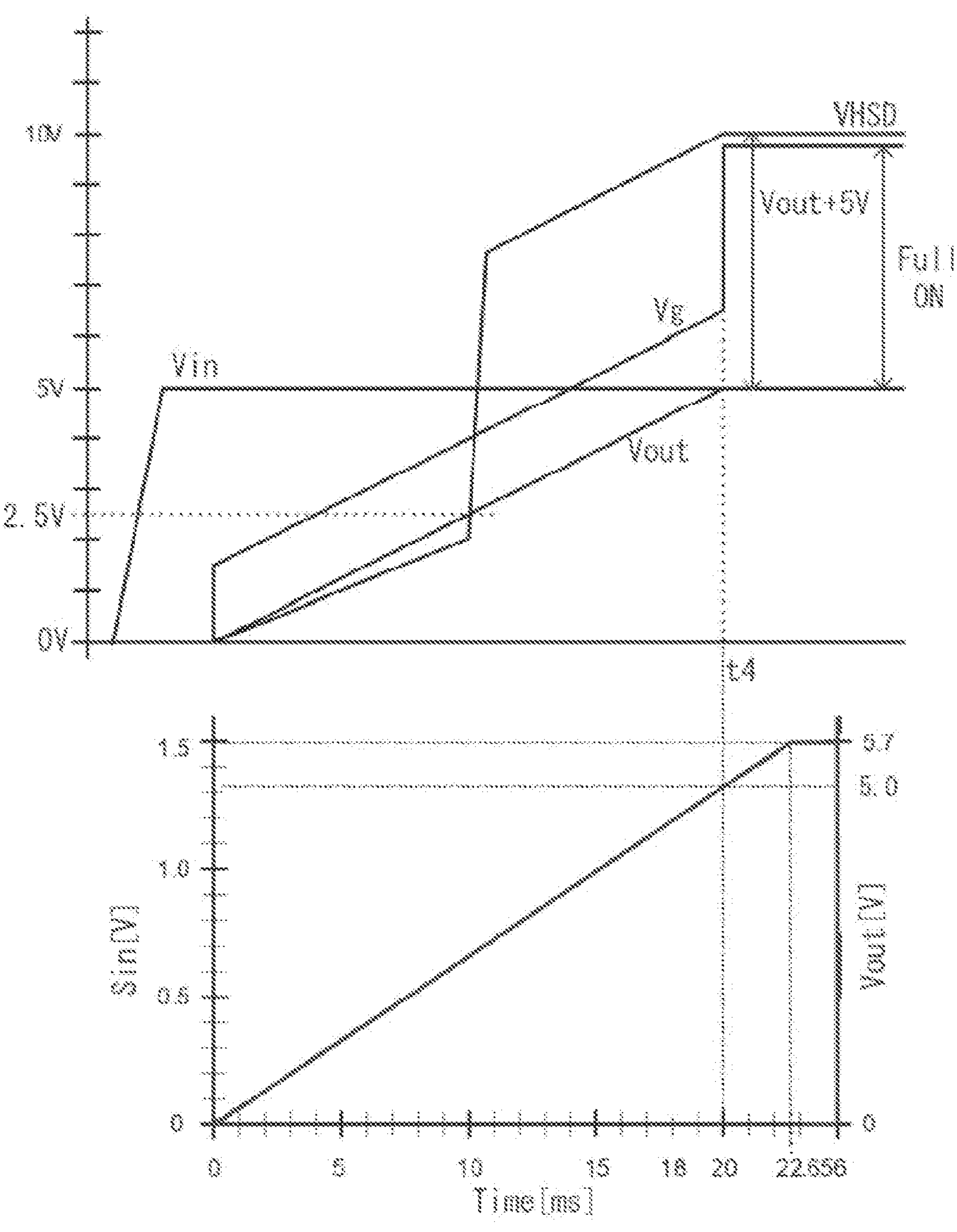
FIG. 6 is a timing diagram of a second operation example of a switch device at startup.

Next, the operation of the startup of the switch device 2 is described below. FIG. 5 shows a timing diagram of a first operation example of the switch device 2 at startup. In FIG. 5 and FIG. 6 to be described shortly, the input voltage Vin, the output voltage Vout, the control voltage Vg and a boosted power supply voltage VHSD are shown in the upper part, and the input signal Sin is shown in the lower part.

Moreover, as shown in FIG. 4, the switch device 2 includes a booster circuit 30. The booster circuit 30 boosts the output voltage Vout to generate the boosted power supply voltage VHSD. VHSD=Vout+$\alpha$, and the booster circuit 30 is formed by, for example, a charge pump. In FIG. 5 and FIG. 6, as an example, $\alpha$=5 V.

As shown in FIG. 4, the input voltage Vin or the boosted power supply voltage VHSD as a power supply voltage supplied to an output stage (not shown) of the error amplifier AP. More specifically, the application end of the input voltage Vin is connected to an anode of a diode D1, and an application end of the boosted power supply voltage VHSD is connected to an anode of a diode D2. Respective cathodes of the diodes D1 and D2 are commonly connected to the output stage. Accordingly, when Vin>VHSD, Vin is supplied to the output stage; when Vin<VHSD, VHSD is supplied to the output stage. With the diodes D1 and D2, a backflow can be prevented.

The description is provided with reference to FIG. 5. In a state of startup of the input voltage Vin, that is, a timing t0, the counter 29 starts counting, and the input signal Sin rises from 0 V. At this point in time, the output voltage Vout is 0 V, and the control voltage Vg rises.

Then, as the input signal Sin rises, the output voltage Vout and the control voltage Vg rise. Because the input signal Sin rises in a sloped shape, a current flowing into the output capacitor Cout becomes a fixed current, and Vgs (that is, a difference between Vout and Vg) of the switch element 1 is fixed. At a timing t1, the output voltage Vout reaches a predetermined voltage (for example, 2.5 V herein). Thus, the booster circuit 30 starts a boost operation, and the boosted power supply voltage VHSD rises to Vout+α (α=5 V herein). Then, as the input signal Sin rises, the output voltage Vout, the control voltage Vg and the boosted power supply voltage VHSD rise.

If the boosted power supply voltage VHSD exceeds the input voltage Vin at a timing t2, the supply of a power supply voltage to the output stage is switched from the input voltage Vin to the boosted power supply voltage VHSD.

Then, when the input signal Sin reaches a maximum voltage (for example, 1.5 V herein) at a timing t3, the input signal Sin is then fixed. However, in this operation example, since the output voltage Vout is lower than the input voltage Vin when the input signal Sin is at the maximum voltage, the output voltage Vout (for example, Vout=5.7 V, and Vin=8 V herein) is output via the adjustment by the output voltage control unit 26. At this point in time, the control voltage Vg=Vout+Vt (where Vt is a clamping voltage).

FIG. 6 shows a timing diagram of a second operation example of the switch device 2 at startup. In FIG. 5, the input voltage Vin is 8 V; however, in FIG. 6, Vin is set to be 5 V which is lower than that in FIG. 5. Accordingly, as shown in FIG. 6, before the input signal Sin reaches the maximum voltage (=1.5 V), the output voltage Vout reaches the input voltage Vin (Vout=5 V) at a timing t4.

Accordingly, the error amplifier AP switches from an amplifying operation to a comparing operation at the timing t4, the control voltage Vg substantially functioning as the boosted power supply voltage VHSD is output from the output stage of the error amplifier AP, and the switch element 1 is turned to a full-on state. At this point in time, since it is necessary for the control voltage Vg to be higher than the input voltage Vin, the booster circuit 30 is provided.

4. Variation Example

Figure 7:
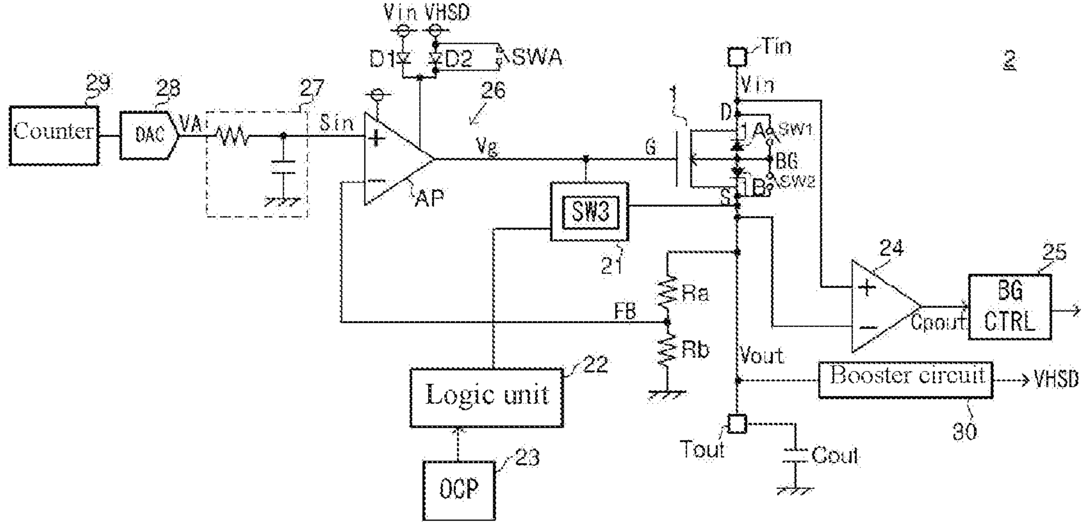
FIG. 7 is a diagram of a configuration of a switch device of a variation example of the present disclosure.

FIG. 7 shows a diagram of a configuration of a switch device 2 of a variation example. In this configuration, a difference from FIG. 4 is that, a switch SWA that shorts the anode and the cathode of the diode D2 on the side of the boosted power supply voltage VHSD is provided. As the details associated with the second operation example (FIG. 6) described above, when the output voltage Vout reaches the input voltage Vin before the input signal Sin reaches a maximum voltage, that is, when the switch element 1 becomes a full-on state, the switch SWA becomes turned on. Accordingly, the diode D2 is invalid, and a drop in a forward voltage of the diode D2 from the boosted power supply voltage VHSD is prevented, hence further suppressing an on resistance of the switch element 1.

5. Other

The embodiments of the present disclosure can be appropriately modified in various ways within the scope of the technical idea shown in the claims. The various embodiments and modifications that have been described so far may be combined as appropriate to the extent that there is no contradiction. The above embodiments are merely examples of the embodiments of the present disclosure, and the meanings of terms of the present disclosure or each component are not limited to those described in the above embodiments.

6. Notes

As described above, a switch device (2) according to one aspect of the present disclosure includes:

- a switch element (1), including:
  - a first end to which an input voltage (Vin) is applicable;
  - a second end to which an output voltage (Vout) is applicable; and
  - a control terminal;
- a DA converter (28); and
- an output voltage control unit (26), including the switch element and configured to control the output voltage, wherein
- the output voltage control unit is configured to generate a control voltage (Vg) applicable to the control terminal such that the output voltage is gradually increased according to a ramp-like change in an output of the DA converter (first configuration).

Furthermore, in the first configuration, further including a counter (29) configured to count clocks and output a count value to the DA converter (26) (second configuration).

Furthermore, in the second configuration, a frequency of the clocks may be variable (third configuration).

Furthermore, in any one of the first to third configurations, the output voltage control unit (26) includes an error amplifier (AP) configured to receive a feedback voltage (FB) obtained by dividing the output voltage and an input signal (Sin) based on the output of the DA converter, and output the control voltage (Vg) (fourth configuration).

Furthermore, in the fourth configuration, the output voltage at a time the input signal (Sin) reaches a maximum voltage may be less than the input voltage (fifth configuration).

Furthermore, in the fourth configuration, further including a booster circuit (30), configured to boost the output voltage to generate a boosted power supply voltage (VHSD). The boosted power supply voltage is suppliable to an output stage of the error amplifier. When the output voltage reaches the input voltage before the input signal reaches a maximum voltage, the error amplifier is configured to be switched from an amplifying operation to a comparing operation, thereby turning the switch element to a full-on state (sixth configuration).

Furthermore, in the sixth configuration, further including: a first diode (D1), including an anode connected to an application end of the input voltage; and a second diode (D2), including an anode connected to an application end of the boosted power supply voltage. Each cathode of the first diode and the second diode is commonly connected to the output stage (seventh configuration).

Furthermore, in the seventh configuration, further including a shorting switch (SWA), configured to short the anode and the cathode of the second diode when the output voltage reaches the input voltage (eight configuration).

Furthermore, in any one of the fourth to eight configurations, further including a low-pass filter (27), disposed at an output side of the DA converter and configured to generate the input signal (ninth configuration).

INDUSTRIAL APPLICABILITY

The present disclosure can be used in, for example, server devices, hard disk devices, chargers, and the like.

The invention claimed is:

1. A switch device, comprising:

a switch element, including:

a first end to which an input voltage is applicable;

a second end to which an output voltage is applicable; and a control terminal;

a DA converter;

an output voltage control unit, including the switch element and configured to control the output voltage, wherein the output voltage control unit is configured to generate a control voltage applicable to the control terminal such that the output voltage is gradually increased according to a ramp-like change in an output of the DA converter, wherein the output voltage control unit includes an error amplifier configured to receive a feedback voltage obtained by dividing the output voltage and an input signal based on the output of the DA converter, output the control voltage; and a booster circuit, configured to boost the output voltage to generate a boosted power supply voltage, wherein the boosted power supply voltage is suppliable to an output stage of the error amplifier, and when the output voltage reaches the input voltage before the input signal reaches a maximum voltage, the error amplifier is configured to be switched from an amplifying operation to a comparing operation, thereby turning the switch element to a full-on state.

2. The switch device of claim 1, further comprising:

a counter, configured to count clocks and output a count value to the DA converter.

3. The switch device of claim 2, wherein a frequency of the clocks is variable.

4. The switch device of claim 1, wherein the output voltage at a time the input signal reaches a maximum voltage is less than the input voltage.

5. The switch device of claim 1, further comprising:

a first diode, including an anode connected to an application end of the input voltage; and a second diode, including an anode connected to an application end of the boosted power supply voltage, wherein each cathode of the first diode and the second diode is commonly connected to the output stage.

6. The switch device of claim 5, further comprising:

a shorting switch, configured to short the anode and the cathode of the second diode when the output voltage reaches the input voltage.

7. The switch device of claim 1, further comprising:

a low-pass filter, disposed at an output side of the DA converter and configured to generate the input signal.

* * * * *